United States Patent
Wich et al.

(10) Patent No.: US 12,540,435 B2
(45) Date of Patent: Feb. 3, 2026

(54) FABRIC FOR A FIBER WEB PRODUCING MACHINE AND A METHOD FOR MAKING THE SAME

(71) Applicant: Voith Patent GmbH, Heidenheim (DE)

(72) Inventors: Torsten Wich, Appleton, WI (US); Tina Goodwin, Shiocton, WI (US)

(73) Assignee: Voith Patent GmbH, Heidenheim (DE)

( * ) Notice: Subject to any disclaimer, the term of this patent is extended or adjusted under 35 U.S.C. 154(b) by 388 days.

(21) Appl. No.: 17/897,188

(22) Filed: Aug. 28, 2022

(65) Prior Publication Data

US 2024/0068166 A1    Feb. 29, 2024

(51) Int. Cl.
| | |
|---|---|
| D21F 7/08 | (2006.01) |
| B32B 3/06 | (2006.01) |
| B32B 3/08 | (2006.01) |
| B32B 5/02 | (2006.01) |
| B32B 5/06 | (2006.01) |
| B32B 5/26 | (2006.01) |
| B32B 37/18 | (2006.01) |
| B32B 38/00 | (2006.01) |
| D03D 3/00 | (2006.01) |
| D03D 27/00 | (2006.01) |
| D21F 7/10 | (2006.01) |

(52) U.S. Cl.
CPC ............ *D21F 7/083* (2013.01); *B32B 3/06* (2013.01); *B32B 3/085* (2013.01); *B32B 5/024* (2013.01); *B32B 5/073* (2021.05); *B32B 5/263* (2021.05); *B32B 37/18* (2013.01); *B32B 38/0012* (2013.01); *D03D 3/00* (2013.01); *D03D 27/00* (2013.01); *D21F 7/10* (2013.01); *B32B 2250/20* (2013.01); *B32B 2305/188* (2013.01); *B32B 2413/00* (2013.01); *D10B 2505/00* (2013.01)

(58) Field of Classification Search
CPC ........ D21F 1/0036; D21F 1/0054; D21F 7/08; D21F 7/083; B32B 5/024; B32B 5/26
USPC .......................................................... 428/121
See application file for complete search history.

(56) References Cited

U.S. PATENT DOCUMENTS

| | | | | |
|---|---|---|---|---|
| 4,244,084 A | * | 1/1981 | Gisbourne | D21F 1/0054 24/31 H |
| 5,904,187 A | * | 5/1999 | Davenport | D21F 7/083 442/225 |
| 2017/0044716 A1 | * | 2/2017 | Wich | D21F 1/0054 |

* cited by examiner

*Primary Examiner* — Elizabeth M Imani
(74) *Attorney, Agent, or Firm* — Von Rohrscheidt Patents

(57) ABSTRACT

A fabric for a machine for producing a fiberweb, the fabric including a woven base structure including a first base element and a second base element, wherein the first base element includes a first flat woven base material and the second base element includes a second flat woven base material, wherein the first flat woven base material has a length of twice a length of the fabric and is folded in a middle, creating a first two-ply element and a first fold, wherein the second flat woven base material also has a length of twice the length of the fabric and is folded in a middle, creating a second two-ply element and a second fold, and wherein the first base element and the second base element is arranged so that at least one ply of the first two-ply element is positioned between plies of the second two-ply element.

11 Claims, 1 Drawing Sheet

FABRIC FOR A FIBER WEB PRODUCING MACHINE AND A METHOD FOR MAKING THE SAME

FIELD OF THE INVENTION

The present invention relates to a fabric for a machine for producing a fiber web and to a method of making such fabric.

BACKGROUND OF THE INVENTION

Papermaker's fabrics are used to form, transport, dewater and dry paper on a papermaking machine. Papermakers press felts are designed to transport an aqueous web of paper through the press rollers of a papermaking machine and to assist in the dewatering of the paper web. Commonly, a papermaker's wet press felt is constructed from a woven base fabric having fibrous batt material needled to one or both sides.

Especially for many board and packaging paper machine press positions, void volume through life is a critical press felt requirement for good performance. Many of these positions are sensitive to seam mark and therefore require a seam with uniform dewatering and good structural integrity for full life performance.

The amount of void volume within the base fabric of a press felt is directly related to the amount of water which can be handled internally by the felt as it conveys the paper web through press nips. Felts which can be run without water puddling behind the nip are less likely to result in crushing or damage to the aqueous web. In some cases, multilayered base fabrics are provided to enhance the void volume of the press felts. Papermaker's fabrics may be made by endless weaving without a seam. In such cases, when a fabric is installed, the operating machinery must be partially dismantled so that the fabric can be slipped onto the machine from the side. This is a slow and cumbersome method of installation since endless wet felts are relatively heavy and stiff and are commonly several meters wide and over 30 meters long. Moreover, not all papermaking equipment is designed to permit installation of non-seamed fabrics.

To simplify installation, press fabrics having seams have gained acceptance. It is easier to thread a flat, open-ended fabric through a papermaking machine and then join the fabric's opposing ends together in a seam on the machine, than it is to perform the cumbersome task of installing a non-seamed fabric.

A variety of seams and seaming methods are known in the art. Flat woven fabrics have been constructed with an independent seam structure attached to the ends of the fabric, such as by sewing a woven tape onto the fabric or utilizing clipper hooks. Additionally, papermaking fabrics are commonly formed with loops of yarn projecting from the fabric ends, the loops from both ends of the fabric are intermeshed and joined together by inserting a pintle wire or pin through the intermeshed end loops to secure the ends together.

From an economic perspective, the fabric should be quick and easy to produce. Therefore, it is known for example from document WO 2009/106182 A1 to use a simple, flat woven material and to fold it, thereby producing a two-ply base structure with seam loops for an on-machine-seamable fabric. The use of a flat woven material is advantageous, since it can be produced easily on a comparably simple and cheap loom and the production time is much faster compared to endless weaving techniques. Preparing a seam for such fabrics is described in more detail in document WO 2013/083468 A1.

Unfortunately, in some applications the two-ply designs as described in documents WO 2009/106182 A1 and WO 2013/083468 A1 do not provide enough void volume to guarantee sufficient dewatering properties.

A fabric as described at the beginning and according to the preamble part of claim 1 is already known from U.S. Pat. No. 6,283,165. This document teaches to insert a third ply of flat woven material inside of a two-ply laminate base, thereby increasing the void volume of the fabric compared to a mere two-ply laminate base. However, in some applications even this third ply does not provide sufficient void volume. Furthermore, this approach makes it difficult to control the insert positioning resulting in seam nonuniformity.

BRIEF SUMMARY OF THE INVENTION

The object of the invention is to provide fabric for a fiber web producing machine, especially a press felt, with a high void volume which utilizes as the base structure only flat woven material, which is on-machine-seamable, and which provides an improved seam uniformity.

This object is achieved by a fabric for a machine for producing a fiber web, the fabric including a woven base structure including a first base element and a second base element, wherein the first base element includes a first flat woven base material and the second base element includes a second flat woven base material, wherein the first flat woven base material has a length of substantially twice a length of the fabric and is folded substantially in a middle, creating a first two-ply element and a first fold, wherein the second flat woven base material also has a length of substantially twice the length of the fabric and is folded substantially in the middle, creating a second two-ply element and a second fold, and wherein the first base element and the second base element are arranged so that at least one ply of the first two-ply element is positioned in a sandwich-manner between two plies of the second two-ply element.

The object is also achieved by a method of making a fabric for a machine for producing a fiber web, the fabric including a woven base structure including a first base element and a second base element, wherein the first base element includes a first flat woven base material and the second base element includes a second flat woven base material, wherein both the first flat woven base material and the second flat woven base material have a length of substantially twice a length of the fabric, the method comprising: folding the first flat woven base material substantially in a middle, thus creating a first two-ply element and a first fold, folding the second flat woven base material substantially in a middle, thus creating a second two-ply element and a second fold, and arranging the first base element and the second base element so that at least one ply of the first two-ply element is positioned in a sandwich-manner between two plies of the second two-ply element.

The dependent claims refer to advantageous embodiments of the present invention.

In particular, this object is achieved as claimed in the invention by a fabric as described supra wherein the first flat woven base material has a length of substantially twice the length of the fabric and is folded substantially in the middle, thus creating a first two-ply element and a first fold, wherein the second flat woven base material has also a length of substantially twice the length of the fabric and is folded substantially in the middle, thus creating a second two-ply element and a second fold, wherein the first base element and the second base element are arranged in such a way that at least one ply of the first two-ply element is positioned in a sandwich-manner between the two plies of the second two-ply element. The term "substantially" shall mean here that the corresponding flat woven base material does not have to be exactly twice as long as the final fabric and/or does not have to be folded exactly in the middle, but should deviate not more than 10%, advantageously not more than 5%, from the length or the middle, respectively. This concept according to the present invention has manufacturing advantages. This 4-ply flat woven design of the base structure provides better seam uniformity through more consistent manufacturing methods than current prior art. The base is constructed in a way that allows for easier assembly of a four-ply fabric without intermediate single layer join welds.

In a first advantageous embodiment of the present invention, the first base element and the second base element are arranged in such a way that only one ply of the first two-ply element is positioned in a sandwich-manner between the two plies of the second two-ply element. In other words, one ply of the first two-ply element is positioned in a sandwich-manner between the two plies of the second two-ply element, whereas the other ply of the first two-ply element is positioned outside the two plies of the second two-ply element, and vice versa, meaning that one ply of the second two-ply element is positioned in a sandwich-manner between the two plies of the first two-ply element, whereas the other ply of the second two-ply element is positioned outside the two plies of the first two-ply element.

In an alternative second advantageous embodiment of the present invention, the first base element and the second base element are arranged in such a way that both plies of the first two-ply element are positioned in a sandwich-manner between the two plies of the second two-ply element.

For easy installation in the fiber web producing machine, the fabric is advantageously on-machine-seamable. In particular, it may have first seaming loops along a first widthwise edge which first seaming loops are formed by MD yarns of the first flat woven base material at the first fold, and second seaming loops along a second widthwise edge which second seaming loops are formed by MD yarns of the second flat woven base material at the second fold.

To hold the structure in place during manufacturing, it is proposed that the first flat woven base material is at least temporarily fixed to the second flat woven base material by at least one row of yarn that is stitched close and parallel to the first fold and/or to the second fold. Welding or gluing can also be used to temporarily attach the bases with each other.

Furthermore, it is beneficial if the fiber web side ply. i.e. the ply of the first two-ply element or of the second two-ply element that is positioned on the fiber web side of the fabric, and/or the roll side ply. i.e. the ply of the first two-ply element or of the second two-ply element that is positioned on the roll side of the fabric, is/are slightly longer than the two center plies, i.e. the two plies that are positioned in a sandwich-manner between fiber web side ply and the roll side ply. Thus, the edges of the fiber web side ply and/or the roll side ply can be moved slightly over the seam on the fiber web side and/or roll side, respectively, thereby covering the seam and reducing the risk of seam marking.

In order to increase peelback resistance and yarn-fraying resistance, it is proposed that the MD yarns are bonded to the CO yarns of the first flat woven base material in the areas that extend along the free widthwise edges of the first flat woven base material and/or the MD yarns are bonded to the CD yarns of the second flat woven base material in the areas that extend along the free widthwise edges of the second flat woven base material. MD is the abbreviation of machine direction, whereas CD stands for cross-machine direction.

Of course, the first flat woven base material and/or the second flat woven base material can comprise a multilayer weave. However, to keep the production process of the fabric simple, it is preferred that the first flat woven base material and/or the second flat woven base material— advantageously both flat woven base materials— comprise(s) a single layer weave. For the same reason, it is preferred that the first flat woven base material and/or the second flat woven base material advantageously both flat woven base materials—comprise(s) a plain weave structure. A simple plain weave structure comprises just an over one and under one repeat pattern which can be woven very fast. Other options include any single layer type of base weave, or combining two different base weaves, one for each ply of base.

To increase the capacity of the fabric to store water from the fiber web, it is proposed that the fabric further comprises fibrous batt maternal needled onto at least one side of the woven base structure. Additionally or alternatively, fibrous batt material may be needled to a ply inside the woven base structure. The needling process can also assist or assure that the first flat woven base maternal and the second flat woven base material are securely fixed to each other.

In a preferred embodiment of the present invention, the fabric is a papermaker's press felt.

Another aspect of the present invention refers to a method of making a fabric for a machine for producing a fiber web, especially an inventive fabric as described above, the fabric comprising a woven base structure with a first base element and a second base element, wherein the first base element comprises a first flat woven base material and the second base element comprises a second flat woven base material, wherein both the first flat woven base material and that second flat woven base material have a length of substantially twice the length of the fabric, the method comprising the following steps, folding the first flat woven base material substantially in the middle, thus creating a first two-ply element and a first fold; folding the second flat woven base material substantially in the middle, thus creating a second two-ply element and a second fold; and arranging the first base element and the second base element in such a way that at least one ply of the first two-ply element is positioned in a sandwich-manner between the two plies of the second two-ply element.

Advantageously, the method further comprises the step of at least temporarily fixing the first flat woven base material to the second flat woven base material by at least one row of yarn that is stitched close and parallel to the first fold and/or to the second fold.

To make the fabric on-machine-seamable and to form the corresponding seaming loops it is proposed that the method further comprises the steps of: removing CD yarns from the first flat woven base material at the first fold to create first seaming loops; and removing CD yarns from the second flat woven base material at the second fold to create second seaming loops.

With such seaming loops it is possible to thread the flat, open-ended fabric through the fiber web making machine and then join the fabric's opposing ends together in a seam on the machine. To do so. i.e. to make the fabric endless, it is proposed that the method further comprises the steps of intermeshing the first seaming loops and the second seaming loops to create a seam channel; and inserting a pintle into the seam channel to render the fabric into an endless form.

Other objects and advantages of the present invention will be evident to those skilled in the art from the following description of a presently preferred embodiment. All figures are only schematic.

DETAILED DESCRIPTION OF THE INVENTION

FIGS. 1A-1D are schematic drawings illustrating the manufacturing process of a first preferred embodiment of a fabric according to the present invention. In reality, such a fabric of a modern fiber web making machine may have a width of from 5 to over 33 feet and a length of from 40 to over 400 feet.

Figure 1A:
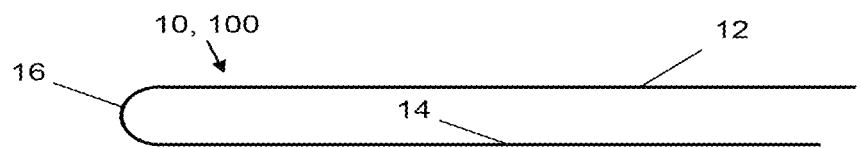
FIG. 1A illustrates a side view of a first flat woven and folded base material according to a first embodiment of the present invention.

FIG. 1A shows a first flat woven base material 10 having a length of substantially twice the length of the final fabric and being folded substantially in the middle, thus creating a first two-ply element with a first ply 12 and a second ply 14 that are connected to each other by a first fold 16. Thus, the first flat woven base material 10 forms a first base element 100. Advantageously, the first flat woven base material 10 exhibits a simple single layer plain weave structure.

Figure 1B:
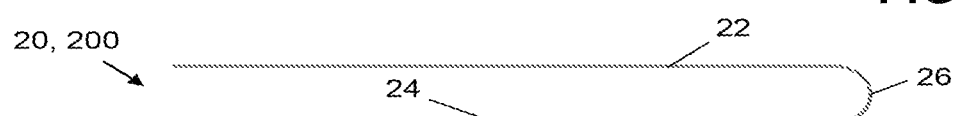
FIG. 1B illustrates a side view of a second flat woven and folded base material according to a first embodiment of the present invention.

Similarly, FIG. 1B shows a second flat woven base material 20 also having a length of substantially twice the length of the final fabric and being folded substantially in the middle, thus creating a second two-ply element with a first ply 22 and a second ply 24 that are connected to each other by a second fold 26. Thus, the first flat woven base material 20 forms a second base element 200. Advantageously, the second flat woven base material 20 also exhibits a simple single layer plain weave structure.

Figure 1C:
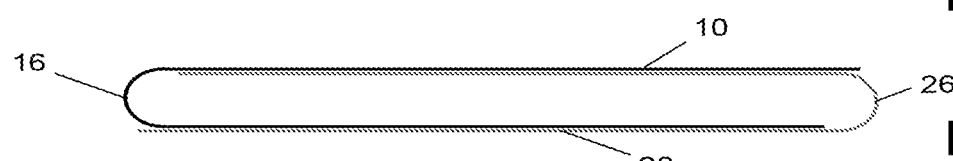
FIG. 1C illustrates a side view of a combined arrangement of the first flat woven and folded base material of FIG. 1A and the second flat woven and folded base material of FIG. 1B.

FIG. 1C shows an arrangement of the first base element 100 and the second base element 200 wherein in this particular embodiment the first base element 100 and the second base element 200 are arranged in such a way that at least the second ply 14 of the first two-ply element is positioned in a sandwich-manner between the two plies 22, 24 of the second two-ply element. At the same time the first ply 22 of the second two-ply element is positioned in a sandwich-manner between the two plies 12, 14 of the first two-ply element. Thus, the arrangement has four plies stacked one above the other.

To make the fabric on-machine-seamable, CD yarns at the first fold 16 are removed from the first flat woven base material 10 so that the MD yarns at the first fold 16 form first seaming loops along a first widthwise edge of the fabric, and also CD yarns at the second fold 26 are removed from the second flat woven base material 20 so that the MD yarns at the second fold 26 form second seaming loops along a second widthwise edge of the fabric. When the final fabric is threaded through the fiber web making machine it can be easily made endless by intermeshing the first seaming loops and the second seaming loops to create a seam channel, and by inserting a pintle into the seam channel.

Figure 1D:
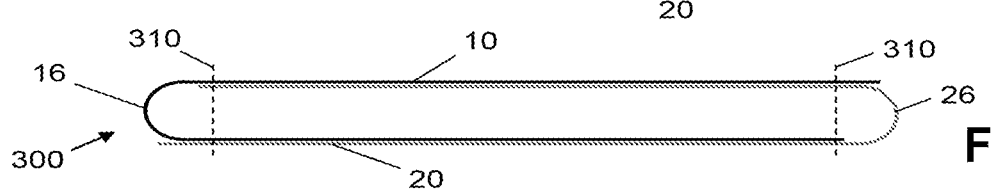
FIG. 1D illustrates a side view of the arrangement of FIG. 1C with some additional stitches.
Figure 2A:
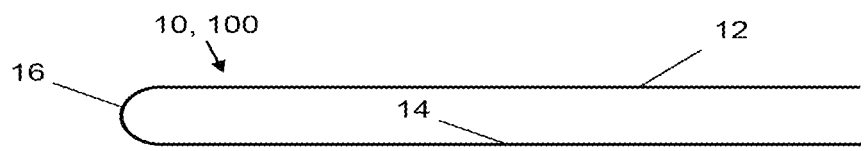
FIG. 2A illustrates a side view of a first flat woven and folded base material according to a second embodiment of the present invention.
Figure 2B:
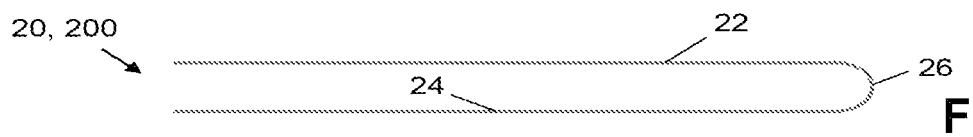
FIG. 2B illustrates a side view of a second flat woven and folded base material according to a second embodiment of the present invention.
Figure 2C:
FIG. 2C illustrates a side view of a combined arrangement of the first flat woven and folded base material of FIG. 2A and the second flat woven and folded base material of FIG. 2B.
Figure 2D:
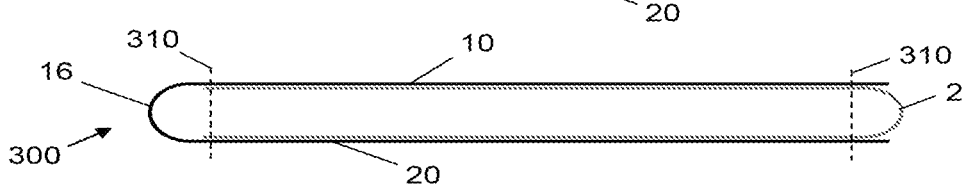
FIG. 2D illustrates a side view of the arrangement of FIG. 2C with some additional stitches.

As shown in FIG. 1D, the first flat woven base material 10 can be—at least temporarily—fixed to the second flat woven base material 20 by rows of yarn 310 that are stitched close and parallel to the first fold 16 and to the second fold 26, respectively. Thus, the woven base structure 300 of the fabric is substantially completed.

Advantageously, especially if fabric is to be used as a press felt, a batt material is needled onto at least one side of the woven base structure 300.

As can be seen in the figures, the first flat woven base material 10 and the second flat woven base material 20 are not exactly folded in their middle, resulting in that the first ply 12 of the first flat woven base material 10 is slightly longer than the second ply 14 of the first flat woven base material 10 and that the first ply 22 of the second flat woven base maternal 20 is slightly shorter than the second ply 24 of the second woven base material. This allows to move the free ends of the longer plies 12 and 24 slightly over the seam on both, the fiber web side and the roll side of the fabric, thus, reducing the risk of seam marking.

FIGS. 2A-2D are just schematic drawings illustrating the manufacturing process of a second preferred embodiment of a fabric according to the present invention. The second embodiment is very similar to the first embodiment shown in FIG. 1A-1D, so that like numerals represent like elements and only the differences between the two embodiments will be discussed in the following. For the like elements it is referred to the above description of the first embodiment.

In this embodiment, the first flat woven base material 10 and the second flat woven base material 20 are folded substantially in their respective middle, wherein the length of the second flat woven base material 20 is slightly smaller than the length of the first flat woven base material 10. Furthermore, both, the first ply 22 and the second ply 24 of the second flat woven base material 20 are positioned in a sandwich-manner between the first ply 12 and the second ply 14 of the first flat woven base material 10. This allows to move the free ends of the two plies 12 and 14 of the first flat woven base material slightly over the seam on both, the fiber web side and the roll side of the fabric, thus, reducing the risk of seam marking.

REFERENCE NUMERALS AND DESIGNATIONS 10 first flat woven base material
12 first ply of the first flat woven base material 10
14 second ply of the first flat woven base material 10
16 first fold
20 second flat woven base material
22 first ply of the second flat woven base material 20

24 second ply of the second flat woven base material 20
26 second fold
100 first base element
200 second base element
300 woven base structure
310 rows of yarns (stitches)

What is claimed is:

1. A fabric for a machine for producing a fiber web, the fabric comprising:
    a woven base structure including a first folded two-ply base element and a second folded two-ply base element,
    wherein the first folded two-ply base element includes a first flat woven base material and the second folded two-ply base element includes a second flat woven base material,
    wherein the first flat woven base material has a length of substantially twice a length of the fabric and is folded substantially in a middle, creating the first folded two-ply base element including a first fold,
    wherein the second flat woven base material also has a length of substantially twice the length of the fabric and is folded substantially in a middle, creating the second folded two-ply base element including a second fold,
    wherein the first folded two-ply base element and the second folded two-ply base element is arranged so that at least one ply of the first folded two-ply base element is positioned in a sandwich-manner between two plies of the second folded two-ply base element, and
    wherein the first fold is arranged at one end of the fabric and the second fold is arranged at another end of the fabric.

2. The fabric according to claim 1, wherein the first folded two-ply base element and the second folded two-ply base element is arranged so that only one ply of the first folded two-ply base element is positioned in a sandwich-manner between the two plies of the second folded two-ply base element.

3. The fabric according to claim 1, wherein the first folded two-ply base element and the second folded two-ply base element is arranged so that both plies of the first folded two-ply base element are positioned in a sandwich-manner between the two plies of the second folded two-ply base element.

4. The fabric according to claim 1, wherein the fabric is on-machine-seamable having first seaming loops along a first widthwise edge which first seaming loops are formed by MD yarns of the first flat woven base material at the first fold, and having second seaming loops along a second widthwise edge which second seaming loops are formed by MD yarns of the second flat woven base material at the second fold.

5. The fabric according to claim 1, wherein the first flat woven base material is at least temporarily fixed to the second flat woven base material by at least one row of yarn that is stitched close and parallel to the first fold or to the second fold.

6. The fabric according to claim 1,
    wherein a ply of the first folded two-ply base element or of the second folded two-ply base element that is positioned on a fiber web side of the fabric, or a ply of the first folded two-ply base element or of the second folded two-ply base element that is positioned on a roll side of the fabric, is slightly longer than two plies that are positioned in a sandwich-manner between the fiber web side ply and the roll side ply.

7. The fabric according to claim 1, wherein MD yarns are bonded to CD yarns of the first flat woven base material in the areas that extend along free widthwise edges of the first flat woven base material or MD yarns are bonded to CD yarns of the second flat woven base material in areas that extend along free widthwise edges of the second flat a woven base material.

8. The fabric according to claim 1, wherein the first flat woven base material or the second flat woven base material has a single layer weave.

9. The fabric according to claim 1, wherein the first flat woven base material or the second flat woven base material has a plain weave structure.

10. The fabric according to claim 1, further comprising: fibrous batt material needled onto at least one side of the woven base structure.

11. The fabric according to claim 10, wherein the fabric is a papermaker's press felt.

* * * * *